United States Patent
He et al.

(10) Patent No.: US 8,864,085 B2
(45) Date of Patent: Oct. 21, 2014

(54) MOUNTING DEVICE FOR CABLE ASSEMBLY

(71) Applicants: Hong Fu Jin Precision Industry (ShenZhen) Co., Ltd., Shenzhen (CN); Hon Hai Precision Industry Co., Ltd., New Taipei (TW)

(72) Inventors: Yu-Wei He, Shenzhen (CN); Xiu-Quan Hu, Shenzhen (CN); Shang-Nong Fan, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 55 days.

(21) Appl. No.: 13/719,224

(22) Filed: Dec. 18, 2012

(65) Prior Publication Data
US 2013/0269157 A1  Oct. 17, 2013

(30) Foreign Application Priority Data
Apr. 12, 2012 (CN) .......................... 2012 1 0106124

(51) Int. Cl.
*H05K 5/00* (2006.01)
*H02G 3/04* (2006.01)
*F16B 1/00* (2006.01)

(52) U.S. Cl.
CPC ............... *F16B 1/00* (2013.01); *H02G 3/0418* (2013.01)

USPC ..................... 248/73; 248/68.1; 361/752

(58) Field of Classification Search
USPC ............. 248/73, 65, 68.1; 174/79, 99 R; 361/826, 752, 756
See application file for complete search history.

(56) References Cited

U.S. PATENT DOCUMENTS

| | | | | |
|---|---|---|---|---|
| 4,216,823 A | * | 8/1980 | Keldmann | 165/55 |
| 6,164,603 A | * | 12/2000 | Kawai | 248/73 |
| 6,318,680 B1 | * | 11/2001 | Benedict et al. | 248/49 |
| 7,022,916 B1 | * | 4/2006 | Cavanaugh et al. | 174/72 A |
| 7,336,484 B2 | * | 2/2008 | McAnally et al. | 361/679.41 |
| 7,594,628 B2 | * | 9/2009 | Yang et al. | 248/58 |
| 7,894,188 B2 | * | 2/2011 | Duke et al. | 361/679.58 |
| D675,511 S | * | 2/2013 | Gary et al. | D8/395 |
| 8,561,950 B2 | * | 10/2013 | Li | 248/74.1 |
| 8,708,288 B2 | * | 4/2014 | Oosawa | 248/68.1 |
| 2013/0271934 A1 | * | 10/2013 | He et al. | 361/752 |

* cited by examiner

*Primary Examiner* — Anita M King
(74) *Attorney, Agent, or Firm* — Novak Druce Connolly Bove + Quigg LLP

(57) ABSTRACT

A mounting device for securing a cable assembly includes a chassis and a mounting member. The chassis includes a sidewall, and a limiting portion and a positioning portion extending from the sidewall. The mounting member is removably mounted to the chassis and includes a mounting piece and a latching portion. The positioning portion defines a positioning hole. The mounting piece clasps the limiting portion. The latching portion is received in the positioning hole and engaged with the positioning portion. A receiving space is defined between the mounting member and the sidewall for securing the cable assembly therein.

20 Claims, 4 Drawing Sheets

MOUNTING DEVICE FOR CABLE ASSEMBLY

BACKGROUND

1. Technical Field

The present disclosure relates to mounting devices, and more particularly to a mounting device for a cable assembly.

2. Description of Related Art

Many electronic devices, such as computers, have multiple cables. The cables are for example, power cables, data cables, communication lines, or keyboard lines. Therefore it is desirable to include some type of cable management apparatus, such as a binding accessory that allows the various cables to be collected together and attached in a position to improve the use of space and the ease of visual examination inside an electronic device. However, the binding accessories of related art are not suitable for temporary use in securing cables, and cause inconvenience and an unnecessary waste of time when cables have to be replaced or rerouted.

Therefore, there is room for improvement within the art.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
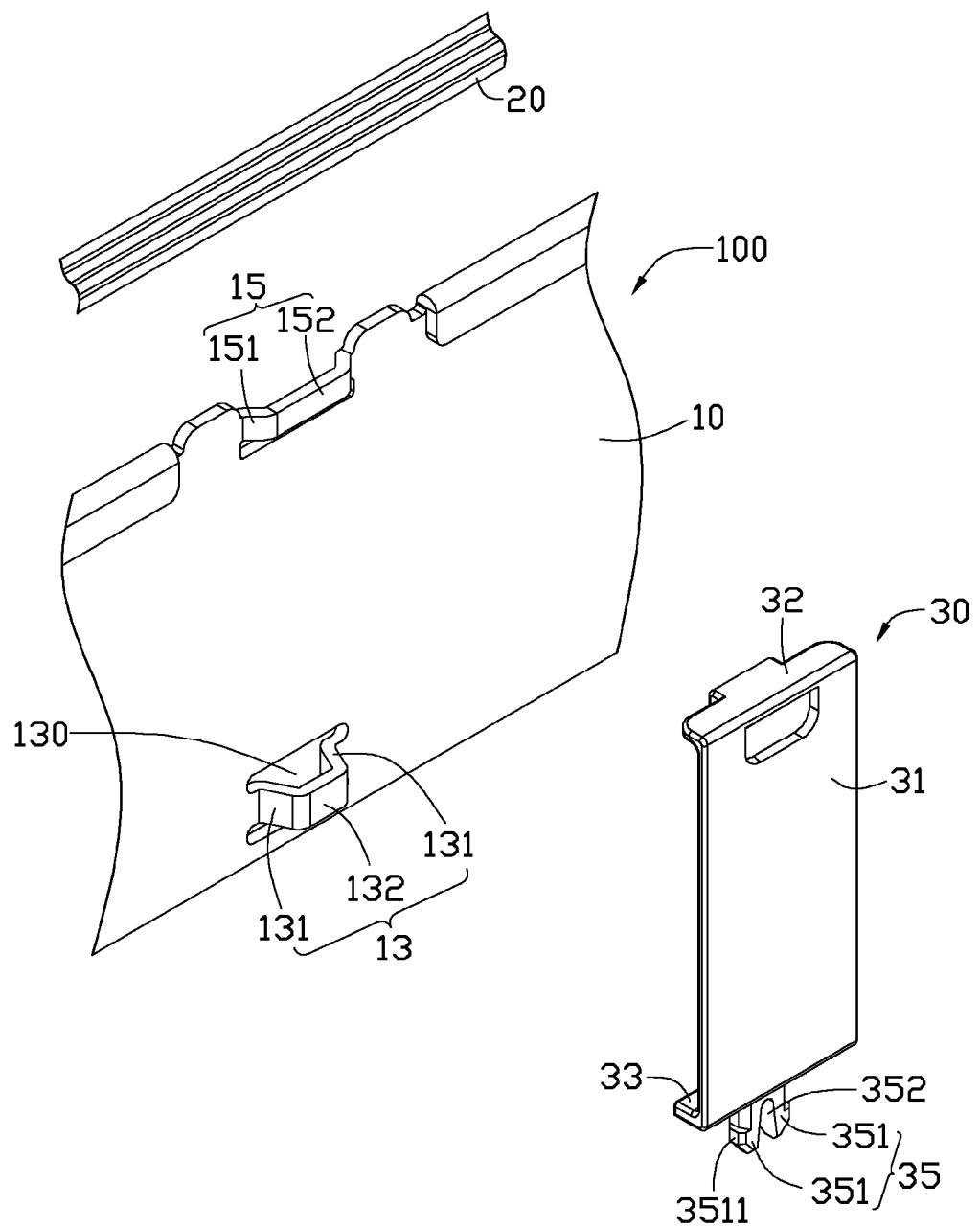
FIG. 1 is an exploded, isometric view of one embodiment of a mounting device and a cable assembly.
Figure 2:
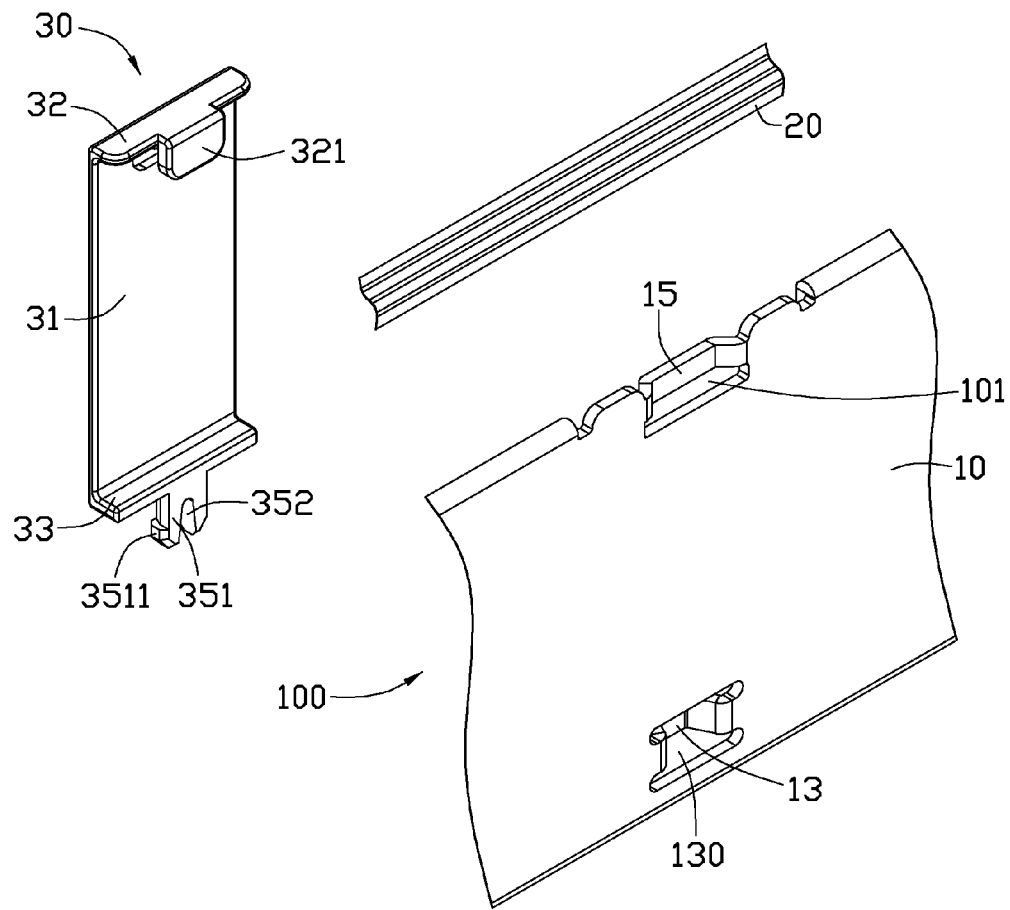
FIG. 2 is similar to FIG. 1, but viewed from a different aspect.

FIG. 1 and FIG. 2 illustrate one embodiment of a mounting device for a cable assembly 20. The mounting device comprises a chassis 100 and a mounting member 30. In the figures only a part of the chassis 100 is shown to simplify explanation.

The chassis 100 comprises a sidewall 10 and a positioning portion 13 extending from the sidewall 10. The positioning portion 13 comprises two first positioning pieces 131 extending from the sidewall 10 and a second positioning piece 132 connecting to the two first positioning pieces 131. In one embodiment, the second positioning piece 132 is substantially parallel to the sidewall 10. A positioning hole 130 is cooperatively defined by the sidewall 10, the two first positioning pieces 131, and the second positioning piece 132. The sidewall 10 defines a cutout 101. A limiting portion 15 extends from two side edges of the cutout 101. An extending direction of the positioning portion 13 is the same as that of the limiting portion 15. The limiting portion 15 comprises two first limiting pieces 151 and a second limiting piece 152 connected to the two first limiting pieces 151. The two side edges of the cutout 101 connecting to the two first limiting pieces 151. In one embodiment, the second limiting piece 152 is substantially parallel to the sidewall 10.

The mounting member 30 comprises a mounting plate 31, a first flange 32, and a second flange 33. The first flange 32 and the second flange 33 extend from two opposite edges of the mounting plate 31. In one embodiment, the first flange 32 and the second flange 33 are substantially perpendicular to the mounting plate 31. A mounting piece 321 extends from the first flange 32, and the mounting piece 321 is substantially parallel to the mounting plate 31. A latching portion 35 extends from a bottom surface of the second flange 33. The latching portion 35 comprises two elastically deformable hooks 351. An opening 352 is defined between the two hooks 351. A block 3511 extends outwards from each of the two elastically deformable hooks 351. In one embodiment, the opening 352 is substantially triangular. An acute angle is defined between the two hooks 351.

Figure 3:
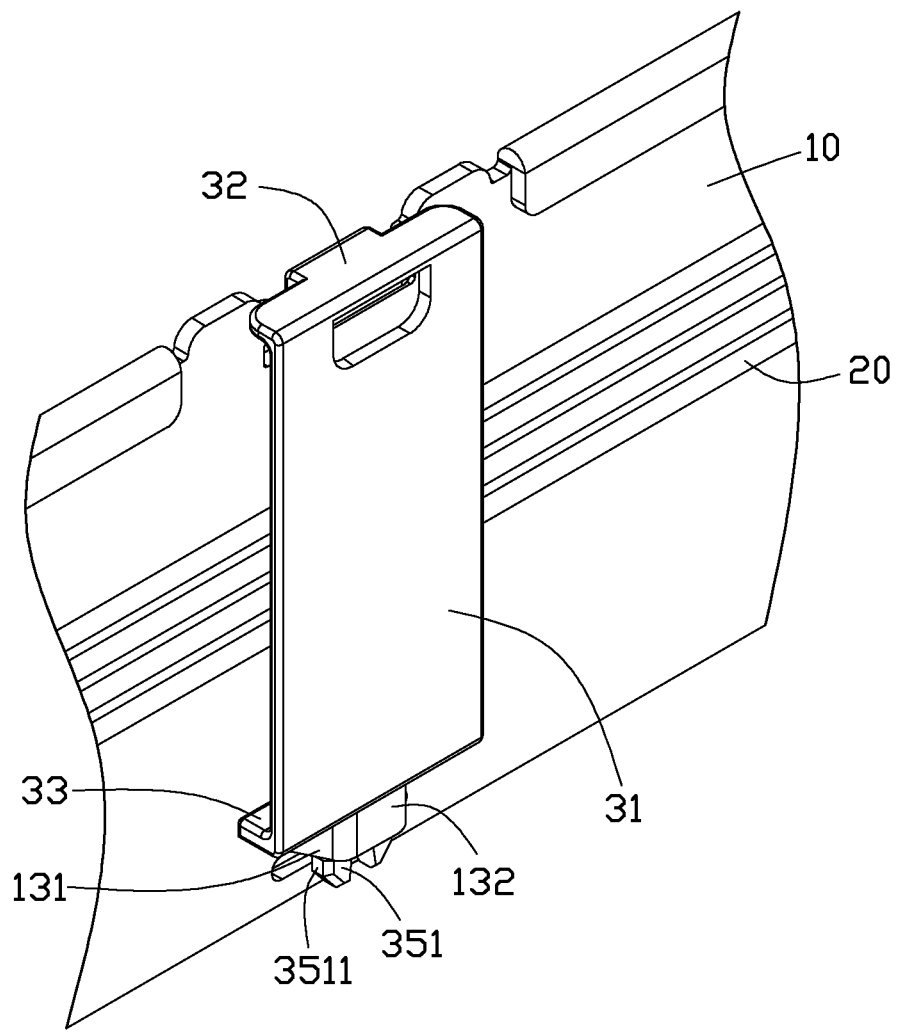
FIG. 3 is an assembled, isometric view of the mounting device and the cable assembly of FIG. 1.
Figure 4:
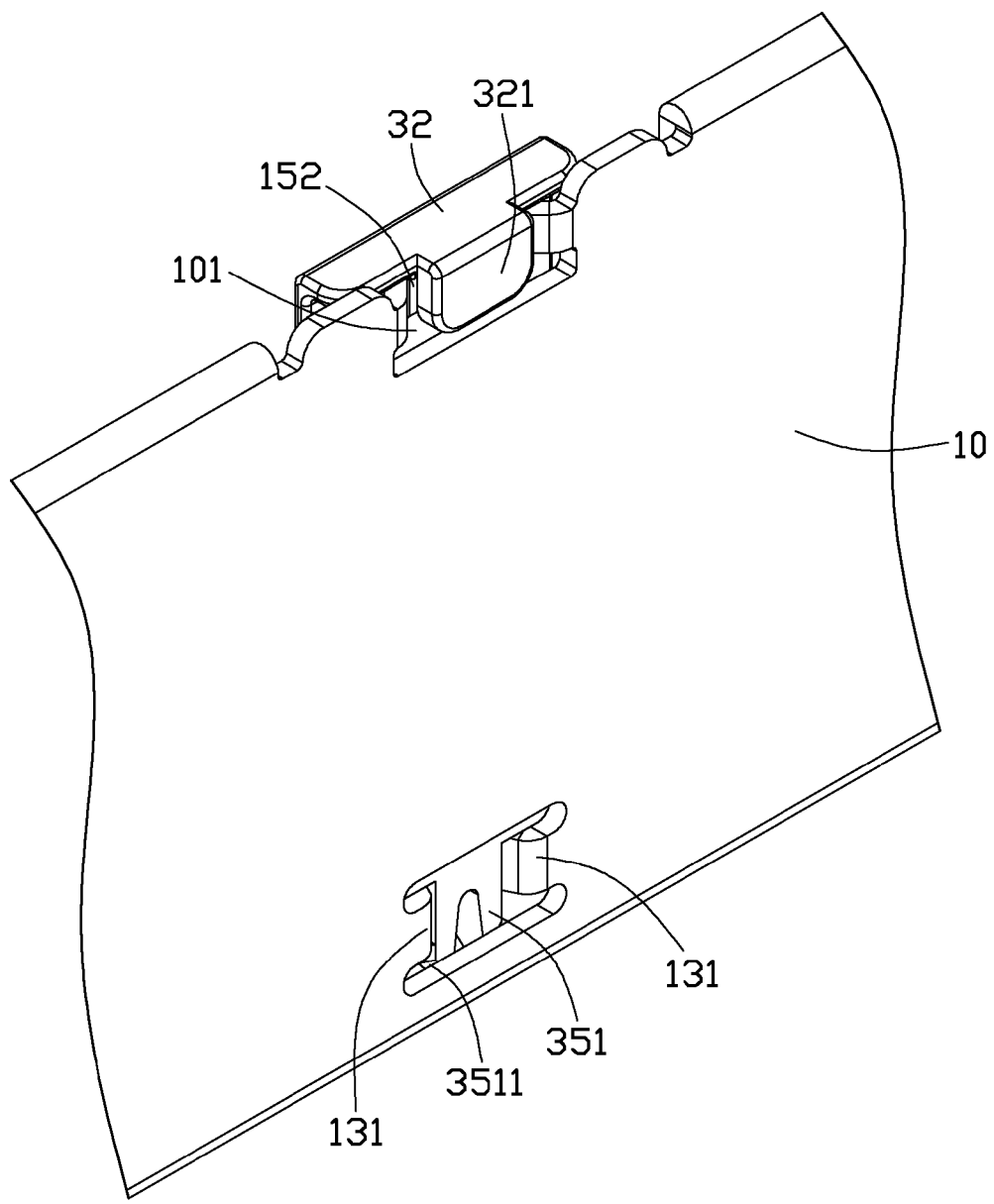
FIG. 4 is similar to FIG. 3, but viewed from a different aspect.

FIG. 3 and FIG. 4 show that in assembly, the cable assembly 20 and the mounting member are moved to be adjacent to the sidewall 10. The mounting plate 31 abuts the cable assembly 20, the latching portion 35 is aligned with the positioning hole 130, and the mounting piece 321 is aligned with the cutout 101. The mounting member 30 is pressed downwards. The two hooks 351 are elastically deformed towards each other and then pass through the positioning hole 130. At the same time, the mounting piece 321 is elastically deformed outwards. Until the first flange 32 abuts the limiting portion 15, the two hooks 351 rebound to engage the two blocks 3511 with the two first positioning pieces 131. The mounting piece 321 is received in the cutout 101 and exerts an elastic force to engage with the second limiting piece 152. Thus, the mounting member 30 is secured to the sidewall 10. The cable assembly 20 is engaged between the mounting plate 31 and the sidewall 10. The mounting piece 321 is coplanar with the sidewall 10 and covers the cutout 101.

In disassembly, the two hooks 351 are pressed towards each other and the mounting member 30 is moved upwards. The latching portion 35 is disengaged from the positioning hole 130, and the mounting piece 321 is disengaged from the second limiting piece 152. Thus, the mounting member 30 can be removed from the sidewall 10, and the cable assembly 20 can be removed from the chassis 100.

It is to be understood, however, that even though numerous characteristics and advantages have been set forth in the foregoing description of embodiments, together with details of the structures and functions of the embodiments, the disclosure is illustrative only and changes may be made in detail, especially in the matters of shape, size, and arrangement of parts within the principles of the disclosure to the full extent indicated by the broad general meaning of the terms in which the appended claims are expressed.

What is claimed is:

1. A mounting device for securing a cable assembly comprising:
   a chassis comprising a sidewall, and a limiting portion and a positioning portion extending from the sidewall; and
   a mounting member removably mounted to the chassis and comprising a mounting piece and a latching portion;
   wherein the positioning portion defines a positioning hole; the mounting piece clasps the limiting portion; the latching portion is received in the positioning hole and engaged with the positioning portion to secure the cable assembly between the mounting member and the sidewall; and a receiving space is defined between the mounting member and the sidewall for securing the cable assembly therein.

2. The mounting device of claim 1, wherein the latching portion comprises two elastically deformable hooks and two blocks extending from the two elastically deformable hooks; the positioning portion comprises two first positioning pieces and a second positioning piece connected to the two first positioning pieces; the two first positioning pieces extend from the sidewall; the two elastically deformable hooks are received in the positioning hole; and the two blocks are engaged with the two first positioning pieces.

3. The mounting device of claim 2, wherein the second positioning piece is substantially parallel to the sidewall; and the positioning hole is defined cooperatively by the sidewall, the two first positioning pieces, and the second positioning piece.

4. The mounting device of claim 2, wherein an acute angle is defined between the two elastically deformable hooks; and an opening is defined between the two elastically deformable hooks, and the opening increases the elasticity of the two elastically deformable hooks.

5. The mounting device of claim 1, wherein the sidewall defines a cutout, the limiting portion extends from two opposite edges of the cutout, and the mounting piece is received in the cutout.

6. The mounting device of claim 5, wherein the mounting piece is coplanar with the sidewall and covers the cutout.

7. The mounting device of claim 5, wherein the limiting portion comprises two first limiting pieces and a second limiting piece connected to the two first limiting pieces; the two first limiting pieces extend from the two opposite edges of the cutout; and the mounting piece clasps the second limiting piece.

8. The mounting device of claim 7, wherein the second limiting piece is substantially parallel to the sidewall.

9. The mounting device of claim 1, wherein the mounting member further comprises a mounting plate, a first flange, and a second flange; the first flange and the second flange extend substantially perpendicularly from two opposite edges of the mounting plate; and the mounting plate is adapted to engage the cable assembly between the mounting plate and the sidewall.

10. The mounting device of claim 9, wherein the mounting piece extends from the first flange and is substantially parallel to the mounting plate; and the latching portion extends from the second flange.

11. A mounting device for securing a cable assembly comprising:
a chassis defining a cutout and comprising a sidewall, and a limiting portion and a positioning portion extending from the sidewall; and
a mounting member removably mounted to the chassis and comprising a mounting piece and a latching portion;
wherein the positioning portion defines a positioning hole; the limiting portion extends from two opposite edges of the cutout; the mounting piece is received in the cutout and clasps the limiting portion; the latching portion is received in the positioning hole and engaged with the positioning portion; and a receiving space is defined between the mounting member and the sidewall for securing the cable assembly therein.

12. The mounting device of claim 11, wherein the latching portion comprises two elastically deformable hooks and two blocks extending from the two elastically deformable hooks; the positioning portion comprises two first positioning pieces and a second positioning piece connected to the two first positioning pieces; the two first positioning pieces extend from the sidewall; the two elastically deformable hooks are received in the positioning hole; and the two blocks are engaged with the two first positioning piece.

13. The mounting device of claim 12, wherein the second positioning piece is substantially parallel to the sidewall; and the positioning hole is defined cooperatively by the sidewall, the two first positioning pieces, and the second positioning piece.

14. The mounting device of claim 12, wherein an acute angle is defined between the two elastically deformable hooks.

15. The mounting device of claim 12, wherein an opening is defined between the two elastically deformable hooks, and the opening increases the elasticity of the two elastically deformable hooks.

16. The mounting device of claim 11, wherein the mounting piece is substantially coplanar with the sidewall and covers the cutout.

17. The mounting device of claim 11, wherein the limiting portion comprises two first limiting pieces and a second limiting piece connected to the two first limiting pieces; the two first limiting pieces extend from the two opposite edges of the cutout; and the mounting piece clasps the second limiting piece.

18. The mounting device of claim 17, wherein the second limiting piece is substantially parallel to the sidewall.

19. The mounting device of claim 11, wherein the mounting member further comprises a mounting plate, a first flange, and a second flange; the first flange and the second flange extend substantially perpendicularly from two opposite edges of the mounting plate; and the mounting plate is adapted to engage the cable assembly between the mounting plate and the sidewall.

20. The mounting device of claim 19, wherein the mounting piece extends from the first flange and is substantially parallel to the mounting plate; and the latching portion extends from the second flange.

* * * * *